(12) United States Patent
Steelberg et al.

(10) Patent No.: US 9,307,299 B2
(45) Date of Patent: Apr. 5, 2016

(54) OPEN API DIGITAL VIDEO RECORDER AND METHOD OF MAKING AND USING SAME

(76) Inventors: Ryan Steelberg, Irvine, CA (US); Chad Steelberg, Newport Beach, CA (US)

( * ) Notice: Subject to any disclaimer, the term of this patent is extended or adjusted under 35 U.S.C. 154(b) by 853 days.

(21) Appl. No.: 12/663,627

(22) PCT Filed: May 7, 2008

(86) PCT No.: PCT/US2008/062860
§ 371 (c)(1),
(2), (4) Date: May 20, 2010

(87) PCT Pub. No.: WO2008/137916
PCT Pub. Date: Nov. 13, 2008

(65) Prior Publication Data
US 2010/0232760 A1    Sep. 16, 2010

Related U.S. Application Data

(60) Provisional application No. 60/928,278, filed on May 7, 2007.

(51) Int. Cl.
| | |
|---|---|
| *H04N 9/80* | (2006.01) |
| *H04N 21/81* | (2011.01) |
| *H04N 5/76* | (2006.01) |
| *H04N 21/4147* | (2011.01) |
| *H04N 21/431* | (2011.01) |
| *H04N 21/433* | (2011.01) |
| *H04N 21/443* | (2011.01) |
| *H04N 21/4788* | (2011.01) |

(Continued)

(52) U.S. Cl.
CPC ............. *H04N 21/8193* (2013.01); *H04N 5/76* (2013.01); *H04N 21/4147* (2013.01); *H04N 21/4316* (2013.01); *H04N 21/4334* (2013.01); *H04N 21/4431* (2013.01); *H04N 21/4788* (2013.01); *H04N 5/765* (2013.01); *H04N 5/775* (2013.01); *H04N 5/781* (2013.01); *H04N 5/907* (2013.01)

(58) Field of Classification Search
CPC ... H04N 7/163; H04N 21/4532; H04N 7/165; H04N 21/4623; H04N 21/84; H04N 5/85; H04N 9/8042; H04N 21/812; H04N 5/76; H04N 5/782; H04N 21/47214; H04N 21/4334; H04N 5/765; G11B 27/105; G11B 2220/2562; G11B 27/329; G11B 27/28; G11B 2220/90; G11B 2220/20
USPC .............................. 725/37; 386/240, 249, 291
See application file for complete search history.

(56) References Cited

U.S. PATENT DOCUMENTS

| | | | |
|---|---|---|---|
| 2002/0122136 A1* | 9/2002 | Safadi et al. | 348/465 |
| 2003/0093790 A1 | 5/2003 | Logan et al. | |

(Continued)

*Primary Examiner* — Nigar Chowdhury
(74) *Attorney, Agent, or Firm* — Barnes & Thornburg LLP; Thomas J. McWilliams; Edward F. Behm, Jr.

(57) ABSTRACT

An apparatus, system and method of a digital video recorder. The apparatus, system and method include at least one memory device, a plurality of communication access points for receiving at least one program play, and an open application programming interface associated with the at least one memory device for programming a plurality of applications to operate on the at least one program play. Each of the plurality of applications correspondent to said open application programming interface manipulates metadata associated with ones of the programs plays. The metadata may relate to interactivity with detailed, non-topical aspects of the ones of the program plays.

20 Claims, 1 Drawing Sheet

(51) Int. Cl.
  *H04N 5/765* (2006.01)
  *H04N 5/775* (2006.01)
  *H04N 5/781* (2006.01)
  *H04N 5/907* (2006.01)

(56) References Cited

U.S. PATENT DOCUMENTS

| | | | |
|---|---|---|---|
| 2003/0152366 A1* | 8/2003 | Kanazawa et al. | 386/69 |
| 2003/0208763 A1 | 11/2003 | McElhatten et al. | |
| 2003/0229900 A1 | 12/2003 | Reisman | |
| 2003/0231855 A1* | 12/2003 | Gates et al. | 386/46 |
| 2004/0031058 A1 | 2/2004 | Reisman | |
| 2005/0060238 A1 | 3/2005 | Gravina et al. | |
| 2005/0177850 A1* | 8/2005 | Boylan et al. | 725/53 |
| 2005/0193425 A1 | 9/2005 | Sull et al. | |
| 2006/0085835 A1 | 4/2006 | Istvan et al. | |
| 2006/0206912 A1 | 9/2006 | Klarfeld et al. | |
| 2006/0236342 A1 | 10/2006 | Kunkel et al. | |
| 2006/0271977 A1 | 11/2006 | Lerman et al. | |
| 2007/0006276 A1 | 1/2007 | Ashley et al. | |
| 2008/0046956 A1* | 2/2008 | Kulas | 725/136 |
| 2008/0304812 A1 | 12/2008 | Jin | |
| 2009/0113475 A1* | 4/2009 | Li | 725/39 |

* cited by examiner

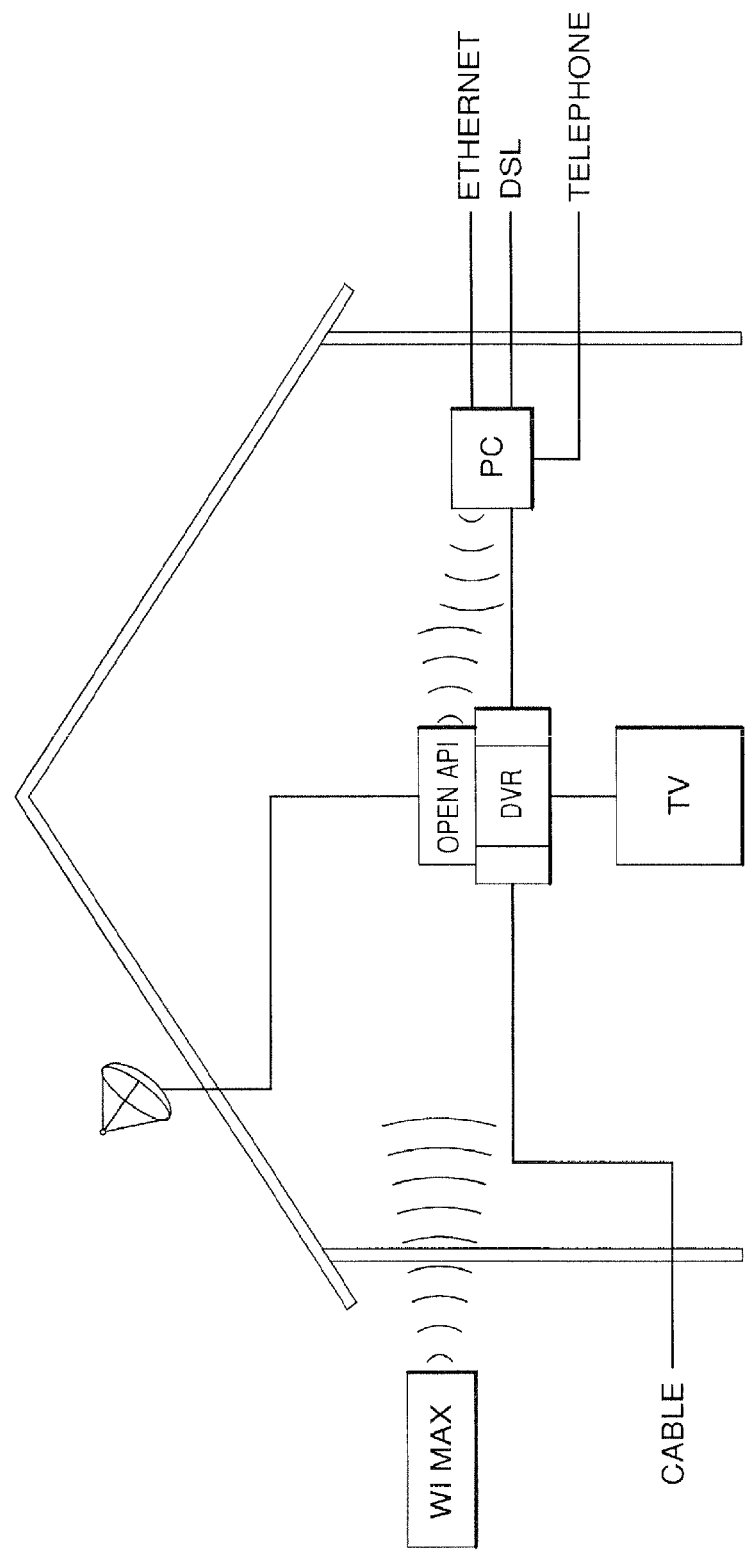

OPEN API DIGITAL VIDEO RECORDER AND METHOD OF MAKING AND USING SAME

BACKGROUND OF THE INVENTION

1. Field of the Invention

The present invention is directed to application software and, more particularly, to an open-API digital video recorder and a method of making and using same.

2. Description of the Background

At present, consumers of television programming have available the ability to record programming and play back such programming at a more convenient time. This ability is typically provided by a digital, or personal, video recorder, or similar type of device having a hard disk memory associated with a CPU, and associated software in the form of a subscription service that provides programming information and the ability to encode data streams. Such products, herein referred to as "DVRs", typically allow the viewer to pause at any time and continue playing, or to record a program for viewing at a later date, in manner a similar to the prior art video cassette recorder ("VCR").

The software associated with a DVR typically is capable of a certain limited number of functions, including providing a user interface to access programs and limited topical information related thereto, calling out to a service provider over any of a number of available calling out methods, downloading channel guide updates, and downloading software updates for the unit itself.

In the available art, the applications that provide these capabilities for the DVR software are provided with the unit upon purchase, and/or are downloaded upon use of the unit. Applications other than those referenced above are generally unavailable for use with such units, and further, the programming interface that allows for the creation of applications other than those referenced above is "closed," meaning only those having access to the unit with explicit permission of the creator of the unit have the ability to write or modify applications for the unit.

Therefore, the need exists for a DVR the provides applications not previously available, in part by providing an open API apparatus, system and method.

SUMMARY OF THE INVENTION

The present invention includes an apparatus, system and method of a digital video recorder. The apparatus, system and method include at least one memory device, a plurality of communication access points for receiving at least one program play, and an open application programming interface associated with the at least one memory device for programming a plurality of applications to operate on the at least one program play. Each of the plurality of applications correspondent to said open application programming interface manipulates metadata associated with ones of the programs plays. Further, the metadata may relate to interactivity with detailed, non-topical aspects of the ones of the program plays.

Thus, the present invention provides a DVR the provides applications not previously available, in part by providing an open API apparatus, system and method.

BRIEF DESCRIPTION OF THE FIGURES

The present invention will be described hereinbelow in conjunction with the following FIGURE, in which like numerals represent like items, and wherein:

FIG. 1 illustrates an exemplary embodiment of the present invention.

DETAILED DESCRIPTION OF THE INVENTION

It is to be understood that the FIGURES and descriptions of the present invention have been simplified to illustrate elements that are relevant for a clear understanding of the present invention, while eliminating, for the purposes of clarity, many other elements found in typical interactive and application programming interface (API) systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

FIG. 1 is a block diagram illustrating a home having resident therein at least one television set having associated therewith at least one digital video recording unit or similar CPU having an associated memory capable of storing one or more programs (hereinafter "DVR"). Thus, as defined herein, a DVR preferably includes at least one memory unit, such as a hard drive, RAM, flash memory, or the like, at least one communication access point, the capability to read metadata received via one of the communication access points, and the capability to write metadata related to a user's use of the DVR. Such communication access points may include one or more of, for example, satellite communication, coaxial cable communication, WiFi communication, WiMax communication, other wireless LAN (local area network) communication, telephonic or DSL communication, T-111 or Ethernet communication, or the like. Further, the DVR preferably includes an operating environment that has associated therewith at least one application program interface (API). The at least one API allows for a programmer to write applications consistent with the operating environment. The API preferably includes a set of routines, protocols, and/or tools to allow for programmers to create software applications consistent with the operating environment, as will be apparent to those of ordinary skill in the art. Programs consistent with the API may be pushed or pulled to or by the DVR over the one or more communication access points in response to or as a command to the operating environment.

The DVR of the present invention may thus have accessible thereto a plurality of communication media types, including, but not limited to, cable television channels, satellite television channels, the worldwide web, email capabilities, data (including video and audio) libraries, and the like, each of which communication media types may form the basis for the creation of a "program play," in which one or more programs (audio or video) is presented to a user. In prior embodiments, television programs that play through the DVR have associated therewith a limited amount of metadata that is indicative only of aspects of the television program, such as time of the program play, length of the program play, title of the program play, description of program play and significant actors or actresses associated with the program of the program play. The limited metadata associated with the program play received over one or more of the respective communication access points is then made available, in the prior art, for limited manipulation by the user with regard only those aspects of the program play with which metadata is associated. Because the API of prior art DVR technology is closed, programmers are not afforded the opportunity to make greater use of information in any respective program play.

The present invention provides, via an open API, DVR, an accessibility by the DVR to program plays or applications over any of a plurality of communication access point types mentioned hereinabove, as well as to play program plays of any communication media type as also mentioned hereinabove. As such, a myriad of applications may be written by programmers for operation on or in any of the variety of communication media, and for operation over nearly any communication accent point type, and such applications may be pushed, pulled, or accessible over any of the aforementioned communication access points.

Such applications written for the open API of the present invention may provide improved interactivity by, for example, exposing via the application metadata associated with each and every aspect of the program play on any given communication media. For example, metadata may be associated with each word spoken, sound made, and picture shown in any given program play, such as a television or radio program, and as such programmers may expose via the open API information not merely contained within or directly associated with the program play, but that is rather associated with the metadata associated with the program play. Such metadata may be made accessible to the user via, for example, application software in the form of a program play overlay, in which an overlay-user interface is placed at the forefront of the program play currently in view of the user, which program play is a television program in the example immediately hereinabove. Such an overlay may take the form of, for example, an overlay that provides links, dropdown menus, windows, or other readily accessible user interfaces. Further, it will be evident to those of ordinary skill in the art that applications may be written that provide multiple windows, menus, or the like simultaneously to a single user, wherein each window plays over a television interface and provides a different program play, and consequently a different overlay, to the user, thereby providing an enhanced version of the known "picture in picture" program plays.

As mentioned hereinabove, the metadata associated with a particular program play of a particular communication media may allow for a "hook" to accessibility of any aspect of the program play, including, but not limited to, externally accessible media, such as other program plays starring the same actor, other program plays starring the same musician, advertising related to goods illustrated in the program play, purchasing points for goods illustrated in the program play, external information, such as World Wide Web (www or Web) information regarding items illustrated in the program play, and the like. Such external information may be accessible via a user activation of aspects of an overlay on the program play, or the accessing of certain aspects of the overlay may lead the user to menus, windows, or the like outside the program play and the desired information may be accessible from such menus, windows, or the like.

In an exemplary embodiment of the present invention, the open API DVR may allow and application having an eBay® overlay placed on a particular television show, such as "The Antiques Roadshow", and the user may thereby access, via the overlay, similar items available on eBay® to those items being illustrated in the show. Alternatively, rather than the eBay® overlay being placed upon The Antiques Roadshow (the program play of the communication media television), which is received by the DVR via the communication access point cable or satellite, eBay®, an affiliate, or a third party programmer may create a unique channel for reception by the DVR over a different communication access point that shows still photographs, videos, audio, or the like, that relates to items of frequent interest to buyers of eBay® goods, and the eBay® overlay be placed thereover to allow a user to access further information with regard to those goods or access points of purchase. As such, eBay® may create its own unique communications media channel for display over television and may send this new channel for communication to the DVR via WiMax or the like, and as such new "television channels" can be created for access via communication access points not generally used currently by televisions.

In an additional exemplary embodiment, a user may be viewing a highly fashion-related program play, such as Desperate Housewives on ABC, in which different fashions or accessories are highly prevalent. If all such information associated with that program play is metatagged, the user may access information on the fashions being worn, or the accessories being used, and such information may include accessibility to other external information, such as comments from fashion editors, available purchase points of the items of interest, and external payment sites to allow for the purchase of those items of interest.

In an additional exemplary embodiment, a user may enter, to an application pulled to the DVR via the open API, a list of that user's fantasy sports players. The present invention may make available to that user a menu listing those fantasy sports players, and the location at which those fantasy sports players may be watched, recorded, or auto-recorded, on any communication media via any communication access point, in real time. Additionally, certain players may be highlighted, such as when that particular player's team possesses the ball, so that the user may switch between communication media or communication access points to, in a targeted manner, allow that user to watch that user's players. Additionally and alternatively with regard to this exemplary embodiment, an application may allow the user to open multiple windows to watch multiple of that user's players in real time, and may maintain in each window an overlay, or may display in a separate window the menu of fantasy players, or may allow the user to toggle between the menu and the video or audio of the games being played.

Thus, for example, a user may select what events certain actions by the DVR are to trigger on, such as autorecording certain events, such as each time a football running back entered into the fantasy football menu interface scores a touchdown. As such, a user can create his or her favorite, or most frequently accessed, metatags, and the metatags may be placed on all content, and on the user's accessing of all content.

In a broader sense, these exemplary embodiments illustrate that one or more applications pulled or pushed via the open API to the DVR may allow the user to assess, in real time, that the user may watch multiple programs of interest, record multiple programs of interest, auto-record one or more programs of interest on or off site (such as via a selectable toolbar generated in accordance with a unique application), use multiple windows of interest simultaneously, be presented with multiple overlays of interest, be presented with multiple menus of interest, all of which may allow the user to access multiple pieces of information or external information not currently available to the user via a television program play. Further for example, as discussed hereinabove, the user may use an application software overlay, while watching a football game for example, to access information on the types of shoes, worn by that user's favorite player, where the user may buy the jersey worn by that user's favorite player, may access an online purchase point for those shoes or that jersey, and may pay using an on-line point of payment account, such as PayPal, all from the DVR of the present invention.

As such, the present invention may provide a highly targeted marketing tool for advertisers, in that each user will access information of interest to that particular user, thereby ensuring that an advertiser's advertisement is played to a user that is most interested in the item being sold. Thereby, advertisers will have less need to place ads in program plays in which 99% of the viewers of the program play are not interested in the item being sold. Further, the present invention will allow such commerce interaction by each user to be uniquely tracked.

Not only will the addition of metadata add more targeted marketing opportunities, such as to make television ads into drill downs rather than just thirty second videos, but additionally the addition of metadata will allow "add-on programming" associated with television shows, which is presently found on line on the Web, to be brought back to the television media. For example, on line universes that are created for association with shows on television may, via metadata, menus, and/or overlays that access the metadata, allow for those on-line universes to be brought back on to television.

Further, the applications written for the DVR are of the present invention may, as do present DVR's, collect metadata on use by the user of the DVR, as mentioned hereinabove. Without violation of privacy laws, such information may, using the applications for the open API discussed herein, be passed to third parties and the metadata may be collected, thereby allowing third parties to generate yet more targeted advertising, more targeted programs plays, and more communication media (such as communication channels) of interest to the highest number of users.

In light of that discussed hereinabove, the open API of the DVR of the present invention may provide hooks into all items of interest and into the operating environment of the DVR, and the exposure of those hooks via the open API will allow third parties to tie into those hooks. Further, users can access applications associated with those hooks via the metadata tags associated with those hooks. Such metadata tags may allow, for example, applications that make use of overlays, video overlays, water marking, auto pause, auto record, toolbars, menus, and the like. The applications so generated may be locally processed on the DVR (such as for certified applications), or can be streamed to the DVR, or can be associated with entirely new, externally generated communication channels. Additionally, as discussed hereinabove, although the DVR may have associated therewith some local storage, vast quantities of remote storage may be made available, such as at external sites accessible via WiMax or the like. As such, a user may be charged for any level of desired storage for programming, and will not be limited for storage by the hardware of the DVR resident within the user's home.

Thus, the present invention may make available any of a variety of communication channels, and any of a variety of applications for accessing metatags associated with the communication media being played on any of those communication channels. For example, a real estate channel may be made available, and the real estate available on the real estate channel may be targeted to the preferences entered by the user of interest. Alternatively, a completely interactive gaming channel may be made available wherein trivia games, casino games, or the like may be made available in accordance with user preferences, and actions undertaken by the user may be received by the DVR as metadata that may be made available to third parties. Alternatively, complex interfaces may be made available via a metadata feed. For example, a user may watch a nature show on the Discovery Channel, and may hear or see mention of an animal of interest to that user. The user may then access, such as via an overlay, a link associated with that animal of interest. That link may provide the user with access to, for example, Google Earth, which may allow for illustration to the user of all animals of that type, anywhere in the world, that have been tagged and placed back into the wild and that are open to sponsorship by a user. The user may be then given the option to sponsor one of the animals in a location of interest to the user, and in the event the user selects an animal to sponsor, an on-line payment interface, such as PayPal, may be accessible to the user for payment of the sponsorship fee. Alternatively, either within the program play on the Discovery Channel, or after drilling down to the animal of interest, the user may be presented with a mention of a country of interest to the user, such as Botswana. The user may pause, and either exit the program play via the overlay, or may exit the Google Earth interface displaying the animals of interest, and may redirect to find information, such as on Wikipedia, on "Botswana." After the user has redirected a sufficient number of times to receive the information of interest to the user with regard to Botswana, the user may elect to be redirected back to the initial location of interest, which in this example is either the program play or the information on the animal of interest.

The present invention may also include social networking. Such social networking may include videoconferencing, video messaging, or placement of personal information or personal ads on line, or placement of video or audio generated by a user that the user would like to make accessible to third parties, from the communication access points accessible to the user via the open API DVR, thus making the user "the star" of his or her own show.

The present invention may additionally include, for example, a mobile DVR, wherein DVR features accessed via mobile televisions, televisions not within the home residence, navigation screens within vehicles, or the like, accessible to any of the aforementioned communication access points, and such mobile DVR may communication with the home, open API DVR.

Although the invention has been described and pictured in a preferred form with a certain degree of particularity, it is understood that the present disclosure of the preferred form has been made by way of example, and that numerous changes in the details of construction and combination and arrangement of parts and steps may be made without departing from the spirit and scope of the invention.

We claim:
1. A digital video recorder, comprising:
at least one memory device;
at least one communication access point for receiving at least one program play;
an open application programming interface associated with said at least one memory device for programming a plurality of applications to operate on metatags associated with at least one of visual and audio indicia contained in the at least one program play, wherein each of the plurality of applications exposes and provides interactivity of a viewer directly with a display of the at least one program play through interaction with external information associated with the metatags, and wherein said external information is one of:
an externally accessible media having an identified characteristic in common with the program play;
an advertisement of goods appearing in the program play;
a purchasing point of goods appearing in the program play; and
information of items appearing in the program play; and wherein the at least one of visual and audio indicia associated with metatags comprises one of:
a word spoken in the program play; and
a sound made in the program play.

2. The digital video recorder of claim 1, wherein ones of the communication access points comprise at least one of satellite communication, coaxial cable communication, WiFi communication, WiMax communication, LAN communication, telephonic communication, DSL communication, and Ethernet communication.

3. The digital video recorder of claim 1, further comprising an operating environment, wherein said operating environment comprises said open application programming interface, and at least one user interface.

4. The digital video recorder of claim 3, wherein each of said plurality of applications is consistent with the operating environment.

5. The digital video recorder of claim 4, wherein at least one of said plurality of applications comprises at least one of a push and a pull over at least one of the communications access points as a response to the operating environment.

6. The digital video recorder of claim 4, wherein at least one said plurality of applications comprises at least one of a push and a pull over at least one of the communications access points as a command to the operating environment.

7. The digital video recorder of claim 1, wherein ones of said communication access points communicate with one or more generators of cable television channels, satellite television channels, the worldwide web, email and data libraries.

8. The digital video recorder of claim 7, wherein each of said program plays comprises that which is generated by the one or more generators of cable television channels, satellite television channels, the worldwide web, email and data libraries.

9. The digital video recorder of claim 1, wherein said open application programming interface associates one of the plurality of applications for remote access by said at least one memory device.

10. The digital video recorder of claim 1, wherein ones of said plurality of application comprise exposed metadata.

11. The digital recorder of claim 10, wherein the exposed metadata comprises metadata associated with at least one of words spoken, sounds made, and pictures shown in at least one of said program plays.

12. The digital video recorder of claim 11, wherein at least one of the plurality of applications comprises a program play overlay available without pause of the program play.

13. The digital video recorder of claim 12, wherein the program play overlay simultaneously provides at least one of multiple windows, multiple menus, and multiple overlays.

14. The digital video recorder of claim 10, wherein the exposed metadata comprises a link to at least one media accessible over at least one of said communication access points form an external location with reference to said memory device.

15. The digital video recorder of claim 14, wherein the link comprises an Internet link.

16. The digital video recorder of claim 14, wherein an activation of the link causes a departure from the program play.

17. The digital video recorder of claim 16, wherein the departure from the program play comprises a redirection to an internet auction site, wherein an item associated with the internet auction site for auction was referenced in the program play prior to the departure.

18. The digital video recorder of claim 16, wherein the departure comprises an advertisement.

19. The digital video recorder of claim 16, wherein the departure occurs upon a trigger event that causes the activation.

20. The digital video recorder of claim 19, wherein the trigger event is a user command.

* * * * *